(12) United States Patent
Ikeda et al.

(10) Patent No.: US 9,682,571 B2
(45) Date of Patent: *Jun. 20, 2017

(54) INK COMPOSITION, INKJET RECORDING SYSTEM, AND INKJET RECORDING METHOD

(71) Applicant: Seiko Epson Corporation, Tokyo (JP)

(72) Inventors: Yasunari Ikeda, Shiojiri (JP); Akihito Sao, Matsumoto (JP); Hiroshi Takahashi, Shiojiri (JP); Shinichi Naito, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,361

(22) Filed: May 18, 2016

(65) Prior Publication Data

US 2016/0279965 A1 Sep. 29, 2016

Related U.S. Application Data

(63) Continuation of application No. 14/440,242, filed as application No. PCT/JP2013/079850 on Nov. 5, 2013, now Pat. No. 9,399,718.

(30) Foreign Application Priority Data

Nov. 8, 2012 (JP) .................................. 2012-246129

(51) Int. Cl.
*B41J 2/175* (2006.01)
*B41J 2/19* (2006.01)
(Continued)

(52) U.S. Cl.
CPC . *B41J 2/19* (2013.01); *B41J 2/01* (2013.01); *B41J 2/175* (2013.01); *B41J 2/1752* (2013.01);
(Continued)

(58) Field of Classification Search
CPC ....................................................... B41J 2/2107
See application file for complete search history.

(56) References Cited

U.S. PATENT DOCUMENTS 3,912,653 A * 10/1975 Alburger ................ G01N 21/91
252/301.19
5,948,512 A 9/1999 Kubota et al.
(Continued)

FOREIGN PATENT DOCUMENTS

EP 1533348 A1 5/2005
EP 1754760 A1 2/2007
(Continued)

*Primary Examiner* — Juanita D Jackson
(74) *Attorney, Agent, or Firm* — Nutter McClennen & Fish LLP; John J. Penny, Jr.

(57) ABSTRACT

An ink composition is held in an ink container that is provided with an ink inlet through which the ink container can be refilled with the ink composition, and is used in a state in which the ink container is fitted into an inkjet recording device that includes a recording head having a nozzle hole that ejects the ink composition, the ink composition including a disperse dye, and at least one of a silicon-based surfactant and a fluorine-based surfactant, the ink composition having a surface tension of 22 to 30 mN/m.

7 Claims, 6 Drawing Sheets

(51) Int. Cl.
  *B41J 2/01* (2006.01)
  *C09D 11/00* (2014.01)
  *C09D 11/328* (2014.01)
  *C09D 11/38* (2014.01)
  *C08K 5/18* (2006.01)
  *C08K 5/3437* (2006.01)
  *C09D 11/30* (2014.01)

(52) U.S. Cl.
  CPC ....... *B41J 2/17506* (2013.01); *B41J 2/17509* (2013.01); *B41J 2/17513* (2013.01); *B41J 2/17546* (2013.01); *B41J 2/17553* (2013.01); *C08K 5/18* (2013.01); *C08K 5/3437* (2013.01); *C09D 11/00* (2013.01); *C09D 11/328* (2013.01); *C09D 11/38* (2013.01); *B41J 2/17503* (2013.01); *C09D 11/30* (2013.01)

(56) References Cited

U.S. PATENT DOCUMENTS

| | | | |
|---|---|---|---|
| 6,059,405 | A | 5/2000 | Mochizuki et al. |
| 7,971,981 | B2 | 7/2011 | Nagashima et al. |
| 9,399,718 | B2* | 7/2016 | Ikeda .......................... B41J 2/19 |
| 2007/0171266 | A1 | 7/2007 | Kluge et al. |
| 2007/0265376 | A1 | 11/2007 | Sao et al. |
| 2009/0043028 | A1 | 2/2009 | Matsuyama et al. |
| 2010/0231671 | A1 | 9/2010 | Anton et al. |
| 2010/0233368 | A1 | 9/2010 | Zhu et al. |
| 2012/0038719 | A1 | 2/2012 | Shimizu et al. |
| 2012/0121831 | A1 | 5/2012 | Kudoh et al. |
| 2015/0284578 | A1 | 10/2015 | Ikeda et al. |

FOREIGN PATENT DOCUMENTS

| | | |
|---|---|---|
| JP | 09-286941 A | 11/1997 |
| JP | 11-048491 A | 2/1999 |
| JP | 11-048492 A | 2/1999 |
| JP | 11-048493 A | 2/1999 |
| JP | 2008-055832 A | 3/2008 |
| JP | 2008-254196 A | 10/2008 |
| JP | 2008-291079 A | 12/2008 |

* cited by examiner

INK COMPOSITION, INKJET RECORDING SYSTEM, AND INKJET RECORDING METHOD

The present application is a Continuation of U.S. application Ser. No. 14/440,242, filed on May 1, 2015, now U.S. Pat. No. 9,399,718 B2, which is a national phase application of PCT/JP2013/079850, filed on Nov. 5, 2013. Priority is claimed under 35 U.S.C. §119 to Japanese Application No. 2012-246129 filed on Nov. 8, 2012 and under 35 U.S.C. §365 to PCT/JP2013/079850 filed on Nov. 5, 2013. The entire teachings of these applications are incorporated by reference herein.

TECHNICAL FIELD

The present invention relates to an ink composition, an inkjet recording system, and an inkjet recording method.

BACKGROUND ART

An inkjet recording device has been known that records an image or a character by ejecting a minute droplet of an ink composition from a nozzle hole of a recording head so that the droplet adheres to a recording medium. An inkjet ink composition that includes a coloring material, a surfactant, water, an organic solvent, and the like has been known as the ink composition.

Various types of performance are required for each element (e.g., ink composition, recording device, and recording medium) when implementing an inkjet recording process. For example, a measure that suppresses a situation in which air bubbles are formed in the ink composition contained in the inkjet recording device has been desired in order to prevent a situation in which the ink composition is ejected in an unstable way, and the recording quality deteriorates. Patent Literature 1 (JP-A-11-048491), Patent Literature 2 (JP-A-11-048492), and Patent Literature 3 (JP-A-11-048493) propose an inkjet printer that includes a deaeration mechanism in order to solve the above problem. Patent Literatures 1 to 3 disclose removing gas dissolved in the ink using the deaeration mechanism, and achieving stable ejection performance, for example.

SUMMARY OF THE INVENTION

Technical Problem

However, the methods disclosed in Patent Literatures 1 to 3 have a problem in that the size of the inkjet recording device increases, and the installation area or the like is limited, since it is necessary to provide the inkjet recording device with the deaeration mechanism.

When the ink has been consumed by the inkjet recording device, and the volume of the ink has decreased, the cartridge (hereinafter may be referred to as "ink container") is replaced with another cartridge, for example. In this case, since the cartridge is filled with the ink in a state in which the ink does not easily come in contact with the air, it is possible to suppress a situation in which gas is dissolved in the ink, and suppress formation of air bubbles.

In recent years, since the amount of ink composition consumed has increased along with an increase in the amount of recording using an inkjet recording device, it has been necessary to frequently exchange the cartridge. In order to reduce the cartridge exchange frequency, attempts have been made that increase the size of the cartridge, or refill the cartridge with the ink composition, for example.

However, the area of contact between the ink composition and gas (i.e., the area of the gas-liquid interface) within the cartridge increases if the size of the cartridge is increased. When the cartridge is refilled with the ink composition from the outside, the ink composition easily comes in contact with the air when refilling the cartridge with the ink composition. Therefore, gas may be easily dissolved in the ink composition, and air bubbles may be formed in the ink composition.

An object of several aspects of the invention is to provide an ink composition from which air bubbles can be promptly removed when air bubbles have been formed in the ink composition. Another object of several aspects of the invention is to provide an ink composition from which air bubbles can be promptly removed even when the ink composition is held in an ink container that has such a shape that the ink composition easily comes in contact with the air. A further object of several aspects of the invention is to provide an inkjet recording system and an inkjet recording method that ensure that air bubbles can be removed from an ink composition when air bubbles have been formed in the ink composition.

Solution to Problem

The invention was conceived in order to solve at least some of the above problems (objects), and may be implemented as described below (see the following aspects or application examples).

Application Example 1

According to one aspect of the invention, an ink composition is held in an ink container that is provided with an ink inlet through which the ink container can be refilled with the ink composition, and is used in a state in which the ink container is fitted into an inkjet recording device that includes a recording head having a nozzle hole that ejects the ink composition, the ink composition including a disperse dye, and at least one of a silicon-based surfactant and a fluorine-based surfactant, the ink composition having a surface tension of 22 to 30 mN/m.

According to Application Example 1, air bubbles can be promptly removed from the ink composition when air bubbles have been formed in the ink composition. This makes it possible to suppress a situation in which air bubbles remain in the ink container, the recording head, and the like, and ensure ejection stability.

Application Example 2

In the ink composition according to Application Example 1, the nozzle hole may have a part in which the area of the cross section of the nozzle hole perpendicular to the ink composition ejection direction decreases discontinuously in the ink composition ejection direction.

According to Application Example 2, since air bubbles can be promptly removed from the ink composition when air bubbles have been formed in the ink composition, it is possible to suppress a situation in which air bubbles remain even when the nozzle hole has a shape that is disadvantageous for discharging or moving air bubbles.

Application Example 3

In the ink composition according to Application Example 1 or 2, the ink container may satisfy the relationship "area of liquid surface at a filling ratio of 5% <area of liquid surface at a filling ratio of more than 5%" when the ink container is fitted into the inkjet recording device in a usage state, the filling ratio being the ratio of the volume of the ink composition with which the ink container is filled to the internal volume of the ink container, and the liquid surface being the gas-liquid interface of the ink composition that is formed inside the ink container.

Even when the ink container has such a shape that the area of contact between the ink composition and gas (i.e., the area of the gas-liquid interface) satisfies the above relationship, and gas may be dissolved in the ink composition, since air bubbles can be promptly removed from the ink composition, it is possible to ensure sufficient ejection stability.

Application Example 4

The ink composition according to any one of Application Examples 1 to 3 may have a surface tension of 22 to 25 mN/m.

According to Application Example 4, air bubbles can be removed more promptly when air bubbles have been formed in the ink composition. This makes it possible to suppress a situation in which air bubbles remain in the ink container, the recording head, and the like, and ensure better ejection stability.

Application Example 5

The ink composition according to any one of Application Examples 1 to 4 may further include a penetrant having an HLB value of 17 to 30.

According to Application Example 5, it is possible to improve penetration of the ink composition during printing while suppressing a deterioration in the dispersion state of the disperse dye.

Application Example 6

The ink composition according to any one of Application Examples 1 to 5 may include a penetrant having an HLB value of less than 17 in a ratio of 1 mass % or less based on the total amount of the ink composition.

According to Application Example 6, it is possible to improve penetration of the ink composition during printing while suppressing a deterioration in the dispersion state of the disperse dye.

Application Example 7

According to another aspect of the invention, an inkjet recording system includes: an ink composition that includes a disperse dye, and at least one of a silicon-based surfactant and a fluorine-based surfactant; an ink container that is provided with an ink inlet through which the ink container can be refilled with the ink composition; and an inkjet recording device that includes a recording head having a nozzle hole that ejects the ink composition, the ink composition having a surface tension of 22 to 30 mN/m.

According to the inkjet recording system, since air bubbles can be promptly removed from the ink composition when air bubbles have been formed in the ink composition, it is possible to suppress a situation in which air bubbles remain in the inkjet recording system, and ensure good ejection stability.

Application Example 8

According to another aspect of the invention, an inkjet recording method includes: filling an ink container with an ink composition, the ink composition including a disperse dye, and at least one of a silicon-based surfactant and a fluorine-based surfactant, and having a surface tension of 22 to 30 mN/m, and the ink container being provided with an ink inlet through which the ink container can be refilled with the ink composition; fitting the ink container into an inkjet recording device that includes a recording head having a nozzle hole that ejects the ink composition; and ejecting the ink composition from the nozzle hole so that the ink composition adheres to a medium.

According to the inkjet recording method, since air bubbles can be promptly removed from the ink composition when air bubbles have been formed in the ink composition, it is possible to ensure good ejection stability, and implement a good recording process that can reliably form the entire image on the medium, for example.

DESCRIPTION OF EMBODIMENTS

Figure 1:
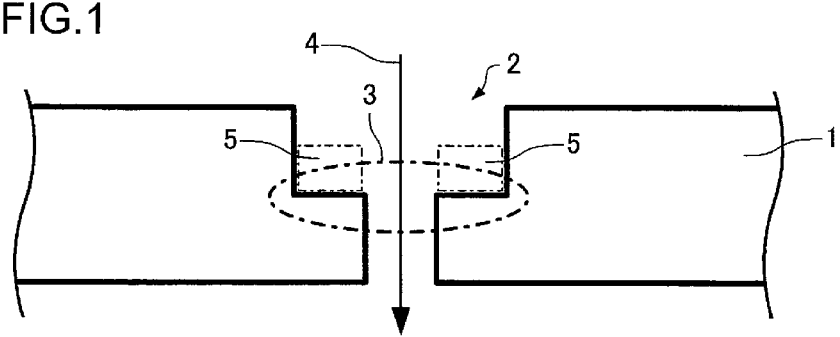
FIG. 1 is a schematic cross-sectional view illustrating an example of a nozzle hole formed in a nozzle plate.

Several exemplary embodiments of the invention are described below. The following exemplary embodiments illustrate an example of the invention. The invention is not limited to the following exemplary embodiments. The invention includes various modifications that can be practiced without departing from the scope of the invention. Note that all of the elements described below in connection with the following exemplary embodiments should not necessarily be taken as essential elements of the invention.

1. Ink Composition

An ink composition according to one embodiment of the invention includes a disperse dye, and at least one of a silicon-based surfactant and a fluorine-based surfactant.

1.1. Disperse Dye

The ink composition according to one embodiment of the invention includes the disperse dye. The disperse dye is suitably used to dye hydrophobic synthetic fibers such as polyester fibers, nylon fibers, and acetate fibers, and is a compound that is insoluble or scarcely soluble in water.

The disperse dye included in the ink composition according to one embodiment of the invention is not particularly limited. Specific examples of the disperse dye include the following.

Examples of a yellow disperse dye include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, 232, and the like. Examples of an orange disperse dye include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, 142, and the like. Examples of a red disperse dye include C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328, and the like. Examples of a violet disperse dye include C.I.

Disperse Violet 1, 4, 8, 23, 26, 27, 28, 31, 33, 35, 36, 38, 40, 43, 46, 48, 50, 51, 52, 56, 57, 59, 61, 63, 69, 77, and the like. Examples of a green disperse dye include C.I. Disperse Green 9 and the like. Examples of a brown disperse dye include C.I. Disperse Brown 1, 2, 4, 9, 13, 19, and the like. Examples of a blue disperse dye include C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, and the like. Examples of a black disperse dye include C.I. Disperse Black 1, 3, 10, 24, and the like.

These disperse dyes may be used either alone or in combination.

Examples of a commercially available product of the disperse dye include Oracet Yellow 8GF (manufactured by Ciba-Geigy, C.I. Disperse Yellow 82), Aizen Sot Yellow 5 (manufactured by Hodogaya Chemical Co., Ltd., C.I. Disperse Yellow 3), Sumiplast Yellow HLR (manufactured by Sumitomo Chemical Co., Ltd., C.I. Disperse Yellow 54), Kayaset Yellow A-G (manufactured by Nippon Kayaku Co., Ltd., C.I. Disperse Yellow 54), Diaresin Yellow H2G (manufactured by Mitsubishi Chemical Corporation, C.I. Disperse Yellow 160), Oil Yellow 54 (manufactured by Chuo Synthetic Chemical Co., Ltd., C.I. Disperse Yellow 54), Diaresin Red H (manufactured by Mitsubishi Chemical Corporation, C.I. Disperse Red 5), Sumiplast Red B-2 (manufactured by Sumitomo Chemical Co., Ltd., C.I. Disperse Red 191), Kayaset Red B (manufactured by Nippon Kayaku Co., Ltd., C.I. Disperse Red 60), Filester violet BA (manufactured by Ciba-Geigy, C.I. Disperse Violet 57), Plast Red 8335 (manufactured by Arimoto Chemical Co., Ltd., C.I. Disperse Violet 17), Plast Red 8375 (manufactured by Arimoto Chemical Co., Ltd., C.I. Disperse Red 60), Plast Blue 8516 (manufactured by Arimoto Chemical Co., Ltd., C.I. Disperse Blue 14), and the like.

The content of the disperse dye in the ink composition according to one embodiment of the invention is preferably 0.1 to 10 mass %, more preferably 0.25 to 9 mass %, and particularly preferably 1 to 8 mass %, from the viewpoint of dyeability and the solubilization capability of the disperse dye.

1.2. Surfactant

The ink composition according to one embodiment of the invention includes at least one of the silicon-based surfactant and the fluorine-based surfactant.

One of the effects of these surfactants is to adjust the surface tension of the ink composition, and removes (discharges) air bubbles from the ink composition when air bubbles have been formed in the ink composition. The surfactants described below may be used either alone or in combination. The surface tension of the ink composition can be appropriately adjusted by changing the type and the composition of the surfactant.

The total content of at least one of the silicon-based surfactant and the fluorine-based surfactant in the ink composition is preferably 0.05 to 1.5 mass %, more preferably 0.05 to 1.2 mass %, and particularly preferably 0.1 to 1 mass %. When the content of the surfactant is within the above range, it is possible to easily adjust the surface tension of the ink composition to 22 to 30 mN/m.

1.2.1. Silicon-Based Surfactant

Examples of the silicon-based surfactant include a surfactant having a polysiloxane structure that includes a siloxane unit. A hydrogen atom, an unmodified hydrocarbon group, an ether-modified hydrocarbon group, a polyester-modified hydrocarbon group, an epoxy-modified hydrocarbon group, an amine-modified hydrocarbon group, a carboxyl-modified hydrocarbon group, a fluorine-modified hydrocarbon group, an alkyloxy-modified hydrocarbon group, a mercapto-modified hydrocarbon group, a (meth) acrylic-modified hydrocarbon group, a phenol-modified hydrocarbon group, a phenyl-modified hydrocarbon group, a carbinol-modified hydrocarbon group, or an aralkyl-modified hydrocarbon group may be included in the side chain of the polysiloxane. The side chain of the polysiloxane may preferably include an unmodified hydrocarbon group, an ether-modified hydrocarbon group, or a polyester-modified hydrocarbon group.

Specific examples of a silicon-based surfactant that includes a dimethylsiloxane unit include BYK-347 and BYK-348 (manufactured by BYK Japan KK); and the like. Specific examples of a polyether-modified organosiloxane include BYK-378, BYK-333, and BYK-337 (manufactured by BYK Japan KK); and the like.

When the silicon-based surfactant is used alone, the content of the silicon-based surfactant in the ink composition is 0.01 to 1.5 mass %, and preferably 0.05 to 1.2 mass %.

1.2.2. Fluorine-based Surfactant

Examples of the fluorine-based surfactant that can be applied to the ink composition according to one embodiment of the invention include a surfactant in which some or all of the hydrogen atoms bonded to a carbon atom included in a hydrophobic group are substituted with a fluorine atom. Specific examples of the fluorine-based surfactant include a perfluoroalkylsulfonic acid salt, a perfluoroalkylcarboxylic acid salt, a perfluoroalkylphosphoric ester, a perfluoroalkyl ethylene oxide adduct, a perfluoroalkylbetaine, a perfluoroalkylamine oxide compound, and the like.

It is preferable to use a fluorine-based surfactant that includes a perfluoroalkyl group or a perfluoroalkenyl group in the molecule. The fluorine-based surfactant may be an anionic fluorine-based surfactant, a nonionic fluorine-based surfactant, or an amphoteric fluorine-based surfactant.

The fluorine-based surfactant is commercially available as Megafac (manufactured by DIC Corporation), Surflon (manufactured by Asahi Glass Co., Ltd.), Novec (manufactured by Sumitomo 3M Ltd.), Zonyls (manufactured by E. I. du Pont de Nemours and Company (DuPont)), and Ftergent (manufactured by NEOS Co., Ltd.).

Specific examples of a commercially available product of the fluorine-based surfactant include Surflon S-211, Surflon S-131, Surflon S-132, Surflon S-141, Surflon S-144, and Surflon S-145 (manufactured by Asahi Glass Co., Ltd.); Ftergent 100 and Ftergent 150 (manufactured by NEOS Co., Ltd.); Megafac F477 (manufactured by DIC Corporation); FC-170C, FC-430, and Fluorad FC4430 (manufactured by Sumitomo 3M Ltd.); FSO, FSO-100, FSN, FSN-100, and FS-300 (manufactured by DuPont); FT-250 and FT-251 (manufactured by NEOS Co., Ltd.); and the like.

These fluorine-based surfactants may be used either alone or in combination. When the fluorine-based surfactant is used alone, the content of the fluorine-based surfactant in the ink composition is 0.01 to 1.2 mass %, preferably 0.05 to 1 mass %, and more preferably 0.1 to 0.75 mass %.

1.3. Additional Component

The ink composition according to one embodiment of the invention may appropriately include water, a dispersant, a penetrant, and an additional additive.

1.3.1. Water

The ink composition according to one embodiment of the invention may include water. Water may be used as the main medium for the ink composition. Water is a component that adheres to a recording medium, and evaporates due to drying. It is preferable to use water from which ionic impurities have been removed as much as possible (e.g., pure water or ultrapure water such as ion-exchanged water, water purified by ultrafiltration, water purified by reverse osmosis, or distilled water). It is preferable to use water sterilized by UV irradiation, addition of hydrogen peroxide, or the like since the growth of fungi and bacteria can be prevented when a pigment dispersion, or an ink composition prepared using the pigment dispersion, is stored for a long time.

1.3.2. Dispersant

The ink composition according to one embodiment of the invention may include a dispersant for dispersing the disperse dye. A formaldehyde condensate of an aromatic sulfonic acid salt may suitably be used as the dispersant. Specific examples of the formaldehyde condensate of an aromatic sulfonic acid salt include a formaldehyde condensate of a sodium aromatic sulfonate, a formaldehyde condensate of a potassium aromatic sulfonate, a formaldehyde condensate of a sodium alkylarylsulfonate, and the like. Examples of a commercially available product of the formaldehyde condensate of an aromatic sulfonic acid salt include Lavelin (manufactured by Dai-ichi Kogyo Seiyaku Co., Ltd.) (formaldehyde condensate of sodium methylnaphthalenesulfonate).

When adding the formaldehyde condensate of an aromatic sulfonic acid salt to the ink composition according to one embodiment of the invention as the dispersant, the content of the formaldehyde condensate of an aromatic sulfonic acid salt in the ink composition is preferably 1 to 10 mass %, more preferably 2 to 9 mass %, and particularly preferably 3 to 8 mass %, from the viewpoint of capability to disperse the disperse dye.

1.3.3. Penetrant

The ink composition according to one embodiment of the invention may include a penetrant. It is preferable to use a penetrant that can improve penetration of the disperse dye into the medium during printing while maintaining the dispersion state of the disperse dye. Examples of such a penetrant include a penetrant that has a high HLB value.

The term "HLB value" used herein refers to a value calculated using the following expression.

$$HLB \text{ value} = 10 \times (IV/OV)$$

where, IV/OV is the ratio (JOB value) of an inorganic value (IV) to an organic value (OV) based on the organic conceptual diagram.

The organic conceptual diagram is obtained by mapping organicity (covalent bonding capability) based on the number of carbon atoms and inorganicity (ion bonding capability) based on a substituent onto a Cartesian coordinate system having an organic axis and an inorganic axis, and has been known as an index that predicts the properties of an organic compound. The organic value of one carbon atom is 20. The total inorganic value (IV) and the total organic value (OV) are calculated from the structure of an organic compound using the organic value and the inorganic value of each substituent included in the organic compound (see "New Technology and Application of Dispersion & Emulsion Systems", edited by Kunio Furusawa, Technosystem Co., Ltd., Jun. 20, 2006, p. 166ff).

An inorganic value/organic value calculation example and a specific example of the HLB value are described below using triethylene glycol monomethyl ether as an example. Triethylene glycol monomethyl ether includes seven carbon atoms, one OH group, and three ether linkages. When calculating the inorganic value of a primary alcohol that includes a plurality of ethylene glycol chains, the inorganic value of the first ether linkage is calculated to be 20, and the inorganic value of each of the other two ether linkages is calculated to be 75. Therefore, the organic value of triethylene glycol is 20×7=140, the inorganic value of triethylene glycol is 100+20+150=270, the IOB value is 270/140=1.93, and the HLB value is 10×1.93=19.3.

The HLB value of the penetrant that may be included in the ink composition according to one embodiment of the invention is preferably 17 to 30, and more preferably 18 to 25. When the penetrant has an HLB value within the above range, the penetrant has sufficiently high hydrophilicity, and the dispersion state of the disperse dye is rarely impaired. This makes it possible to improve penetration into a fabric cloth and the like, and provide the ink composition with storage stability. Examples of the penetrant having an HLB value of 17 to 30 include triethylene glycol monomethyl ether (HLB=19.3), diethylene glycol monomethyl ether (HLB=19.5), 1,2-pentanediol (HLB=20.0), and 1,2-butanediol (HLB=25.0). Among these, triethylene glycol monomethyl ether is preferable.

The content of the penetrant having an HLB value of 17 to 30 in the ink composition according to one embodiment of the invention is preferably 1 to 15 mass %, and more preferably 2 to 10 mass %.

These penetrants may be used either alone or in combination. The ink composition according to one embodiment of the invention may include a penetrant having an HLB value of less than 17. The penetrant having an HLB value of less than 17 exhibits an excellent penetration capability into a fabric cloth, but hydrophobicity becomes predominant over hydrophilicity to some extent. Therefore, the penetrant having an HLB value of less than 17 in the ink composition is preferably adjusted to 17 mass % or less so that the dispersion state of the disperse dye is not impaired.

Examples of the penetrant having an HLB value of less than 17 include triethylene glycol monobutyl ether (HLB=13.5), 1,2-hexanediol (HLB=16.7), and the like.

1.3.4. Additional Additive

The ink composition according to one embodiment of the invention may include a pH-adjusting agent, a chelating agent (e.g., ethylenediamine tetraacetate (EDTA)), a preservative, a fungicide, a rust preventive, and the like in addition to the above components as long as the dispersibility of the disperse dye is not impaired.

Note that it is preferable that the ink composition according to one embodiment of the invention does not include an acetylene glycol-based surfactant. Since an acetylene glycol-based surfactant has low water solubility, or includes a solvent having a small HLB value as a solubilizing agent, the dispersibility of the disperse dye may be impaired, and the storage stability of the ink composition may deteriorate.

1.4. Surface Tension

The ink composition according to one embodiment of the invention has a surface tension of 22 to 30 mN/m. The surface tension of the ink composition may be measured using a surface tensiometer ("CBVP-Z" manufactured by Kyowa Interface Science Co., Ltd.), for example.

The ink composition according to one embodiment of the invention may be prepared to have a surface tension of 22 to 25 mN/m. In this case, air bubbles can be removed more promptly when air bubbles have been formed in the ink composition. This makes it possible to suppress a situation in which air bubbles remain in the ink container, the recording head, and the like, and ensure better ejection stability.

The surface tension of the ink composition according to one embodiment of the invention can be adjusted by adjusting the amounts of the disperse dye, the surfactant, and an optional additional component. In particular, it is effective to adjust the type and the amount of the surfactant since it is possible to effectively adjust the surface tension of the ink composition.

1.5. Advantageous Effects

Since the ink composition according to one embodiment of the invention has a surface tension of 22 to 30 mN/m, air bubbles can be promptly removed from the ink composition when air bubbles have been formed in the ink composition. This makes it possible to suppress a situation in which air bubbles remain in the ink container, the recording head, and the like, and ensure good ejection stability, even when the ink composition is held in an ink container having such a shape that the ink composition easily comes in contact with the air.

1.6. Application of Ink Composition

The ink composition according to one embodiment of the invention is held in an ink container that is provided with an ink inlet through which the ink container can be refilled with the ink composition, and is used in a state in which the ink container is fitted into an inkjet recording device that includes a recording head having a nozzle hole that ejects the ink composition.

Since air bubbles can be promptly removed (discharged) from the ink composition according to one embodiment of the invention when air bubbles have been formed on the ink composition, the above advantageous effects are achieved remarkably when the ink composition easily comes in contact with the air (see the inkjet recording device described below).

2. Inkjet Recording Device

An inkjet recording device according to one embodiment of the invention includes at least a recording head. The inkjet recording device is configured so that the ink container described later can be fitted into the inkjet recording device. An ink composition contained in the ink container is ejected from the recording head so that the ink composition adheres to a predetermined medium.

The inkjet recording device may be a serial inkjet recording device, or may be a line inkjet recording device. The serial inkjet recording device and the line inkjet recording device are provided with a recording head, and configured so that a predetermined volume (mass) of a droplet of an ink composition can be ejected from a nozzle hole of the recording head at a predetermined timing while changing the relative positional relationship between the medium and the recording head so that the ink composition adheres to the recording surface of the medium to form a predetermined image.

The inkjet recording method is not particularly limited as long as a droplet of the ink composition can be ejected from the nozzle hole of the recording head so that the droplet adheres to the medium. Examples of the inkjet recording method include an electrostatic suction inkjet recording method, an inkjet recording method that ejects an ink droplet using a pump pressure, an inkjet recording method that utilizes a piezoelectric device, an inkjet recording method that foams a liquid ink by heating using a micro-electrode to eject an ink droplet, and the like.

The inkjet recording device may appropriately include a housing, a recording head carriage mechanism, a roller, a driver section, a control section, a sensor, a medium feeding mechanism, a tray, an operation panel, and the like in addition to the recording head.

2.1. Recording Head

The recording head includes an ink inlet through which the ink composition is introduced, a mechanism that ejects the ink composition, and a nozzle hole that ejects the ink composition. The ink inlet can be connected to the ink container described later, and the ink composition contained in the ink container is introduced into the recording head. The mechanism that ejects the ink composition is a pressure chamber for which the internal volume is changed using a piezo element, for example. The mechanism that ejects the ink composition can apply pressure to the ink composition. The ink composition to which pressure has been applied in the pressure chamber is ejected from the nozzle hole toward a predetermined medium.

The recording head may include a plurality of members such as a nozzle plate, a pressure chamber-forming substrate, a piezo substrate, an ink channel-forming substrate, and a sub-tank. The nozzle hole may be formed in the nozzle plate, for example.

The nozzle hole allows the ink composition to flow in the ejection direction. The nozzle hole is formed as a channel that is narrower than the pressure chamber so that the ink composition pressurized in the pressure chamber can be easily ejected in the form of a droplet.

The shape of the nozzle hole is not particularly limited. The nozzle hole may extend in the ink composition ejection direction, and have a columnar shape, a circular truncated cone shape, an elliptical columnar shape, a prismatic shape, a truncated pyramidal shape, or a combination thereof.

When the nozzle plate is made of a metal, the nozzle hole may be formed by punching the nozzle plate, for example. When the nozzle plate is made of silicon, the nozzle hole may be formed by anisotropic etching that utilizes an etching mask and an etchant, for example. When the nozzle plate is made of silicon, and the nozzle hole is formed by anisotropic etching, the accuracy of the shape of the nozzle hole is improved as compared with the case of forming the nozzle hole by punching. It is also possible to form a plurality of nozzle holes at a reduced interval. Therefore, it is preferable to form the nozzle plate using silicon when it is desired to improve the resolution of the recording head.

When the nozzle plate is made of silicon, and the nozzle hole is formed by anisotropic etching, the nozzle hole may be formed to have a shape obtained by stacking two columns that differ in diameter, by utilizing the effect of anisotropic etching, for example. Specifically, the nozzle hole may be formed so that the nozzle hole has a columnar shape on the side of the pressure chamber, and has a columnar shape having a smaller diameter on the side opposite to the pressure chamber. In such a case, the diameter of the nozzle hole may change discontinuously. In other words, the nozzle hole may have a part in which the area of the cross section of the nozzle hole perpendicular to the ink composition ejection direction decreases discontinuously in the ink composition ejection direction. When the nozzle hole is formed to have a prismatic shape, the nozzle hole may also have a shape in which the area of the cross section of the nozzle hole perpendicular to the ink composition ejection direction decreases discontinuously in the ink composition ejection direction.

It is preferable to form the nozzle plate to have a thickness of 50 micrometers or more in order to produce the nozzle plate in a stable manner, for example. In this case, it is preferable to form the nozzle hole to have a shape in which the area of the cross section of the nozzle hole perpendicular to the ink composition ejection direction decreases discontinuously in the ink composition ejection direction. It is possible to eject a droplet of the ink composition at a higher speed by reducing the diameter of the nozzle hole on the side where the ink composition is ejected. If the nozzle hole is formed to have a shape in which the area of the cross section of the nozzle hole does not decrease discontinuously while merely reducing the diameter of the nozzle hole, the flow resistance of the nozzle hole may increase to a large extent. It is possible to eject an ink droplet at a speed that ensures that the ink droplet reaches the recording medium in a stable manner, and provide an appropriate flow resistance, by forming the nozzle hole to have a shape in which the area of the cross section of the nozzle hole decreases discontinuously.

FIG. 1 is a schematic cross-sectional view illustrating an example of such a nozzle hole. In the example illustrated in FIG. 1, a nozzle hole 2 is formed in a nozzle plate 1, and the area of the cross section of the nozzle hole 2 decreases discontinuously in the ink composition ejection direction in the vicinity of the center of the nozzle plate 1 in the thickness direction (see the boundary part 3). When the nozzle hole 2 has the shape illustrated in FIG. 1 in which the area of the cross section of the nozzle hole 2 decreases discontinuously (see the boundary part 3), it is possible to cause the ink composition to form a meniscus in a stable manner even when a printing process is performed at a high speed of 70 ppm (pages per minute) or more.

When the nozzle hole 2 has the shape illustrated in FIG. 1 in which the area of the cross section of the nozzle hole 2 decreases discontinuously (see the boundary part 3), the line of flow may easily become unstable when the ink composition flows through the boundary part 3. Therefore, when air bubbles have been formed in the ink composition, the air bubbles tend to remain around an accumulation part 5 illustrated in FIG. 1. This may impair the ejection stability of the ink composition. However, since air bubbles can be promptly removed (discharged) from the ink composition according to one embodiment of the invention, the ejection stability of the ink composition is remarkably improved when the recording head has a nozzle hole having the above shape.

3. Ink Container

The ink composition according to one embodiment of the invention is held in an ink container. The ink container includes an ink inlet through which the ink container can be refilled with the ink composition. An ink container according to a first embodiment and an ink container according to a second embodiment are described below.

3.1. First Embodiment

An ink container 21 according to the first embodiment, and an example of an inkjet recording device (hereinafter may be referred to as "printer") that utilizes the ink composition supplied from the ink container 21, are described below with reference to the drawings.

Figure 2:
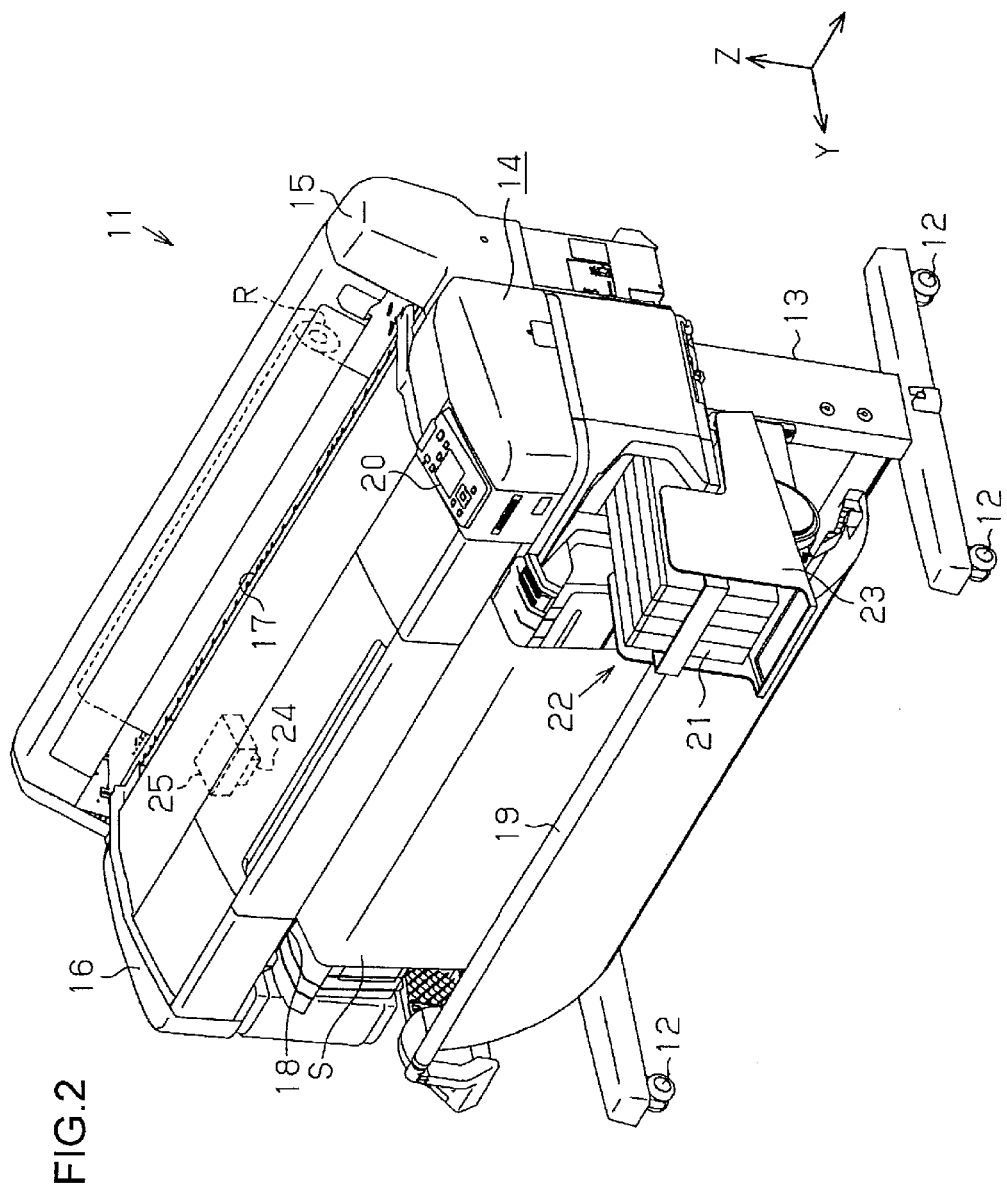
FIG. 2 is a perspective view illustrating an example of an inkjet recording device into which an ink container is fitted.
Figure 3:
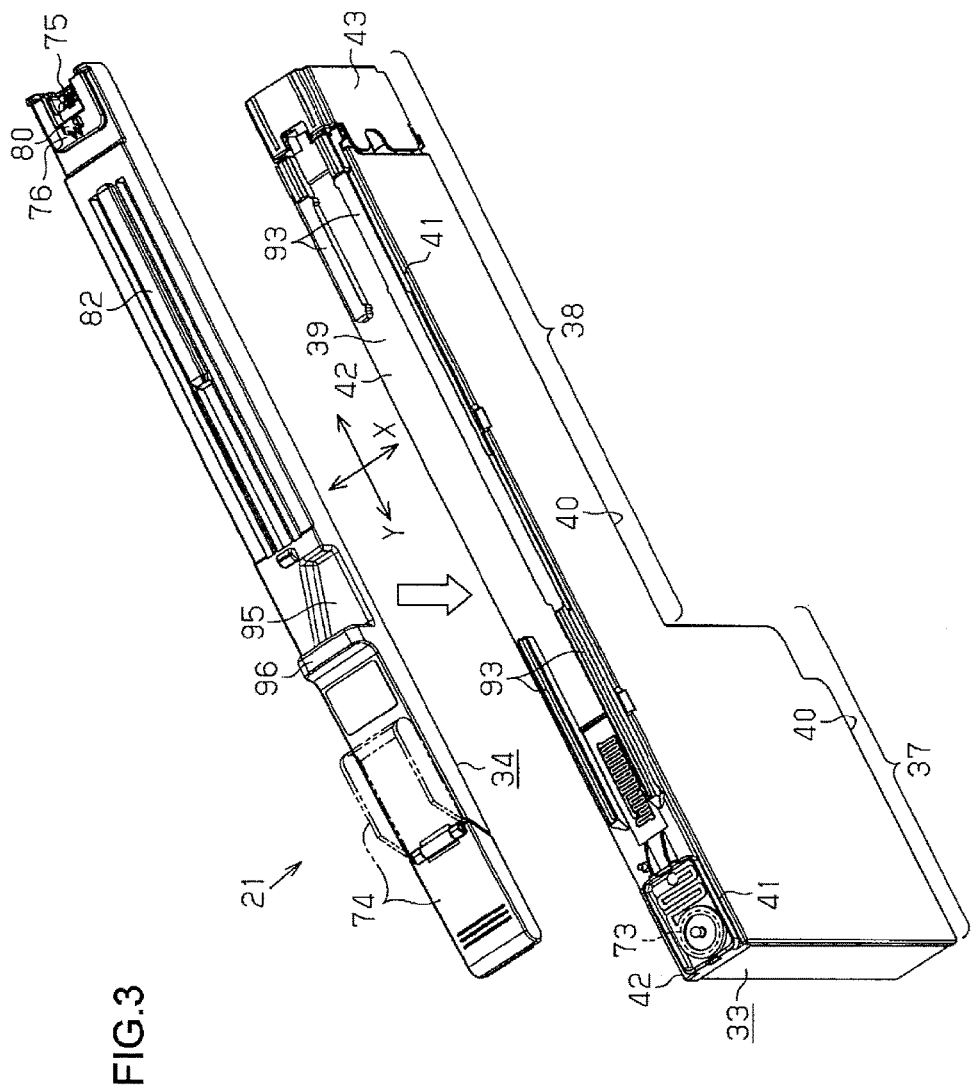
FIG. 3 is a perspective view illustrating an example of an ink container in a state in which a slider is separated.
Figure 4:
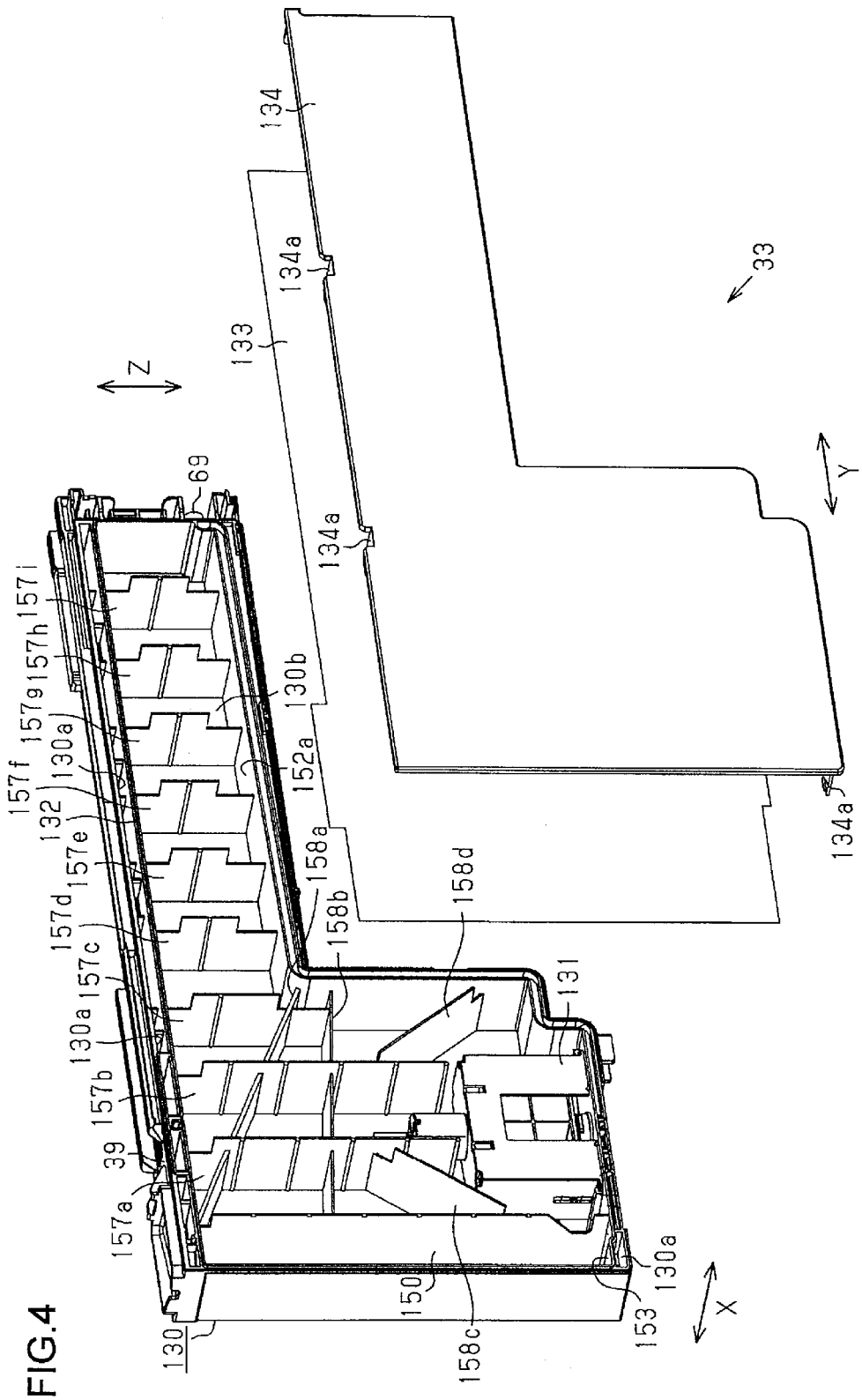
FIG. 4 is an exploded perspective view illustrating an example of an ink container.
Figure 5:
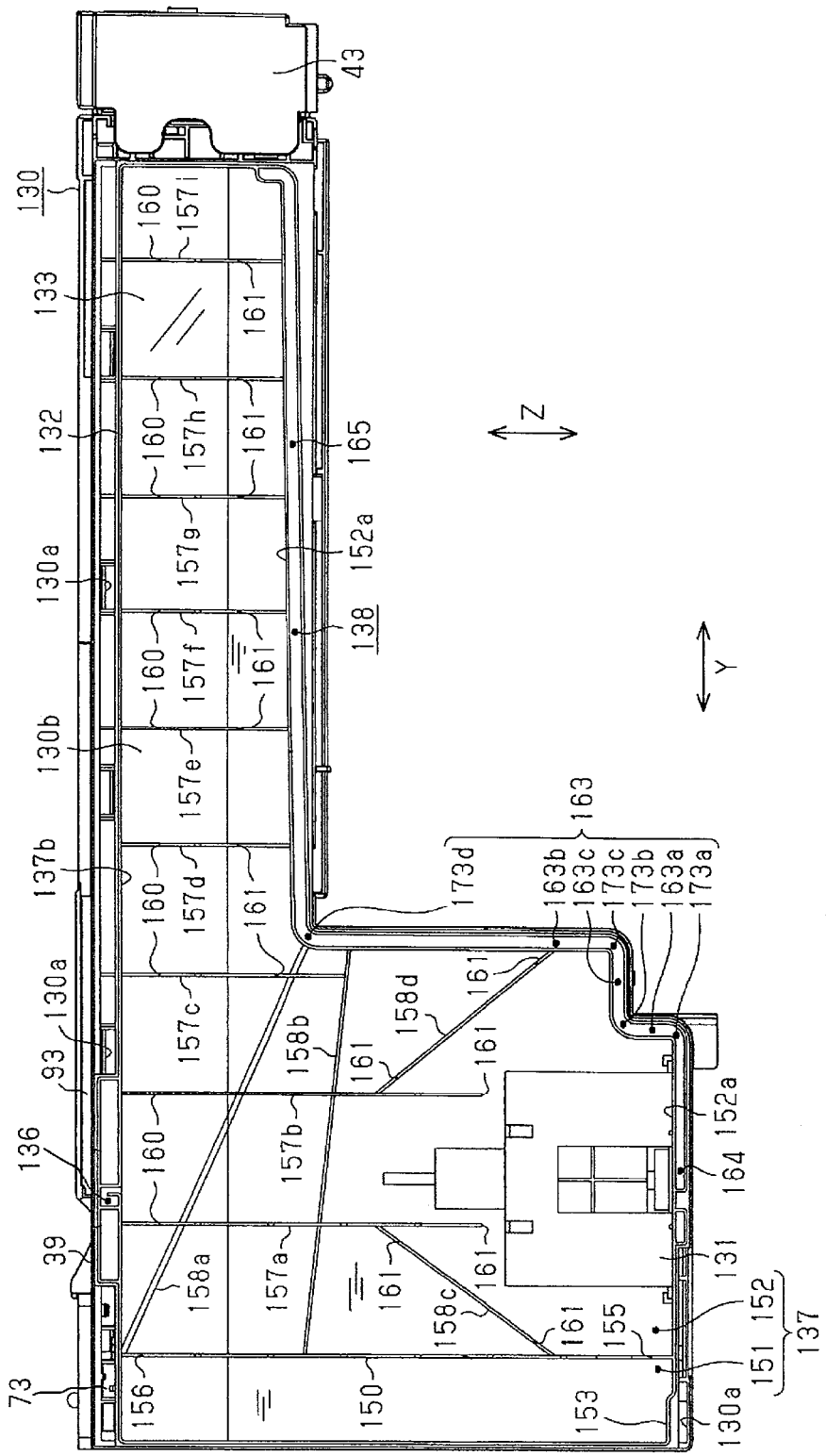
FIG. 5 is a side view schematically illustrating a state in which a film is bonded to a holder case.

FIG. 2 is a perspective view illustrating an inkjet recording into which the ink container 21 according to the first embodiment is fitted. FIG. 3 is a perspective view illustrating the ink container 21 according to the first embodiment in a state in which a slider 34 is separated. FIG. 4 is an exploded perspective view illustrating the ink container 21 according to the first embodiment. FIG. 5 is a side view schematically illustrating the ink container 21 according to the first embodiment in a state in which a film 133 is bonded to a holder case 130.

As illustrated in FIG. 2, the inkjet recording device 11 includes a leg 13 to which wheels 12 are attached at the lower end, and a main body 14 that is formed approximately in the shape of a rectangular parallelepiped, and is positioned on the leg 13. Note that a direction along the gravitational direction is referred to as a vertical direction Z, and the longitudinal direction of the main body 14 that intersects the vertical direction Z (perpendicularly intersects the vertical direction Z in the first embodiment) is referred to as a transverse direction X. A direction that intersects both the vertical direction Z and the transverse direction X (perpendicularly intersects both the vertical direction Z and the transverse direction X in the first embodiment) is referred to as a depth direction Y.

As illustrated in FIG. 2, a feeder 15 that protrudes upward is provided in the rear part of the main body 14. A cylindrical roll R of paper S (long medium) is provided inside the feeder 15. A housing 16 forms the exterior of the main body 14, and an inlet 17 for introducing the paper S fed from the feeder 15 into the housing 16 is formed at a position on the front side of the feeder 15.

An outlet 18 for discharging the paper S from the housing 16 is formed on the front side of the main body 14. A medium feeding mechanism (not illustrated in the drawings) that feeds the paper S fed from the feeder 15 from the inlet 17 toward the outlet 18 is provided inside the housing 16. A medium-receiving unit 19 that receives the paper S discharged from the outlet 18 is provided on the front side of the main body 14 at a position lower than the outlet 18.

An operation panel 20 that allows the user to perform a setting operation and an input operation is provided on the upper side of the main body 14 at one end (the right end in FIG. 2) in the transverse direction X that is situated outside the feeding path of the paper S. The ink container 21 that can hold the ink composition is secured on the lower part of the main body 14 at one end (the right end in FIG. 2) in the transverse direction X that is situated outside the feeding path of the paper S.

A plurality of ink containers 21 (four ink containers 21 in the first embodiment) are provided corresponding to the type and the color of the ink composition. The plurality of ink containers 21 are arranged side by side in the transverse direction X to form an ink container unit 22. Note that the ink container unit 22 has an exposed part that is situated on the front side (outer side) of the main body 14 in a state in which each ink container 21 is secured on the main body 14. Each side of the exposed part of the ink container unit 22 in the transverse direction X, and the lower side of the exposed part of the ink container unit 22 in the vertical direction Z, are covered with a frame member 23 that is secured on the main body 14, and has an approximately U-shaped cross-sectional shape.

A carriage 25 that holds a recording head 24 provided inside the housing 16 so that the carriage 25 can reciprocate in the transverse direction X (i.e., main scan direction). An ink supply mechanism (not illustrated in the drawings) for supplying the ink composition contained in the ink container 21 to the recording head 24 is provided inside the housing 16. A recording process (printing process) is performed by ejecting a droplet of the ink composition from the recording head 24 toward the paper S that is fed by the medium feeding mechanism, and the ink contained in the ink container 21 is consumed by ejecting the droplet of the ink composition. In the first embodiment, the ink container 21 is used in a state in which the ink container 21 is fitted to the frame member 23 of the inkjet recording device 11, and secured on the inkjet recording device 11.

As illustrated in FIG. 3, the ink container 21 according to the first embodiment includes an ink holder 33 that holds the ink, and a slider 34 that is disposed on the ink holder 33 in the antigravitational direction (vertical direction).

The ink holder 33 is formed in the shape of a rectangular parallelepiped (that is formed approximately in the shape of the letter "L" in a side view) that extends in the longitudinal direction (depth direction Y) that perpendicularly intersects the longitudinal direction of the main body 14 approximately in the horizontal direction, and has a fixed width in the lateral direction (transverse direction X) that perpendicularly intersects the longitudinal direction approximately in the horizontal direction. Specifically, the ink holder 33 includes a first holder section 37 that has an approximately square side shape when viewed in the lateral direction (transverse direction X), and a second holder section 38 that is situated on the rear side of the first holder section 37, and has an approximately rectangular shape that is long in the depth direction Y. Flat sections 41 and 42 that continuously extend in the longitudinal direction (depth direction Y) without a step are formed on either end of the upper side 39 of the ink holder 33 in the lateral direction, and the slider 34 can slide along the flat sections 41 and 42. The lower side 40 of the ink holder 33 has a shape having a step formed by the first holder section 37 and the second holder section 38 that extend in the longitudinal direction (depth direction Y).

As illustrated in FIG. 3, an ink inlet 73 for injecting the ink into the ink holder 33 is provided on the upper side 39 of the ink holder 33 in a first part of the ink holder 33 that is situated outside the inkjet recording device 11. In the first embodiment, the first holder section 37 corresponds to the first part, and the ink inlet 73 is provided in the first holder section 37. The ink inlet 73 can be covered with the slider 34 so that the ink inlet 73 that can be operated from the outside of the inkjet recording device 11 is not exposed when the ink is not injected.

Specifically, the slider 34 is formed to have an approximately rectangular external shape that extends in the longitudinal direction, and approximately completely overlaps the upper side 39 of the ink holder 33. The slider 34 is configured so that an openable cover 74 covers the upper side of the ink inlet 73 provided to the ink holder 33 when one end of the slider 34 is inserted into the frame member 23, and the slider 34 approximately completely overlaps the upper side 39 of the ink holder 33. Specifically, the slider 34 includes the openable cover 74 that is provided at the end of the slider 34 in the longitudinal direction, and is moved between a position that at which the openable cover 74 covers the ink inlet 73, and a position at which the ink inlet 73 is exposed. Note that the term "insertion direction" used hereafter refers to the insertion direction of the slider 34 into the frame member 23 unless otherwise specified.

In the first embodiment, the openable cover 74 is pivotally supported by the slider 34 around an axis that extends along the lateral direction of the ink holder 33 at a position away from the ink inlet 73 in the direction of the second holder section 38 (second part) in a state in which the ink inlet 73 is covered. Therefore, the user can uncover the ink inlet 73 by moving the front side of the openable cover 74 (situated at the front end of the slider 34 in the longitudinal direction) upward, and rotating the openable cover 74 by about 180° toward the inkjet recording device 11 (toward the second holder section 38) (see the two-dot chain line in FIG. 3).

Specifically, the openable cover 74 can be positioned on the rear side of the ink inlet 73 by setting the openable cover 74 from a state in which the openable cover 74 covers the ink inlet 73 (see the solid line in FIG. 3) to a state in which the ink inlet 73 is exposed (see the two-dot chain line in FIG. 3). In the first embodiment, the ink inlet 73 is provided in the vicinity of the front end of the first holder section 37 of the ink holder 33 so that the length of the openable cover 74 in the depth direction Y required to cover the ink inlet 73 does not increase.

The ink container 21 illustrated in FIG. 3 also includes a connection section 43 that is connected to the inkjet recording device 11, a recording chip 75 (i.e., storage section), a chip holder 76 (i.e., storage section-holding member), a protrusion 80 that is provided to the chip holder 76, a projection 82, a protrusion 93, a recess 95, a finger placement part 96 (for sliding the slider 34), and the like. Note that the ink container 21 according to the first embodiment need not necessarily include these elements (shapes), and an appropriate element may be added, as required.

The internal configuration of the ink holder 33 is described below. As illustrated in FIG. 4, the ink holder 33 includes a holder case 130 that is formed approximately in the shape of the letter "L" when viewed in the transverse direction X, a float valve 131 (i.e., valve mechanism) that is provided inside the holder case 130, a film 133 that is bonded (e.g., thermally welded) to the holder case 130 so as to cover a case opening 132 of the holder case 130, and a cover 134 that is formed of a resin, and covers the case opening 132 through the film 133. The holder case 130 is integrally formed so that the right side opens, and a locking part 130a that locks a claw part 134 formed on the cover 134 is formed on the outer side of the ring-shaped case opening 132.

As illustrated in FIG. 5, when the film 133 is bonded to the holder case 130 so as to cover the case opening 132 of the holder case 130, the space enclosed by the holder case 130 and the film 133 functions as an air chamber 136 that communicates with the air, an ink chamber 137 (i.e., liquid-holding chamber) that holds the ink, and a guide channel 138 (i.e., liquid channel). Note that one end of the guide channel 138 communicates with the ink chamber 137, and a guide outlet that guides the ink contained in the ink chamber 137 to the recording head 24 (inkjet recording device 11) is formed on the other end of the guide channel 138.

As illustrated in FIG. 5, the ink chamber 137 has a shape in which the dimension (height) of the front side in the vertical direction Z is larger than the dimension (height) of the rear side in the vertical direction Z in the same manner as the ink holder 33. The ink chamber 137 is divided into a first ink chamber 151 (i.e., first liquid chamber) and a second ink chamber 152 (i.e., second liquid chamber) by a partition wall 150 that intersects a ceiling surface 137b (i.e., inlet-forming surface in which the ink inlet 73 is formed).

Note that the partition wall 150 extends along the vertical direction Z, and also intersects an opposing surface (bottom) 153 that is positioned opposite to the ceiling surface 137b. The width of the partition wall 150 in the transverse direction X is approximately equal to the width of the holder case 130 from a left sidewall 130b to the case opening 132. The partition wall 150 is integrally formed with the holder case 130 at a front position within the ink chamber 137 at which the height in the vertical direction Z is large so as to perpendicularly intersect the sidewall 130b of the holder case 130, and protrude from the sidewall 130b toward the case opening 132 (i.e., the front side in FIG. 5). Therefore, the height of the second ink chamber 152 in the vertical direction Z at a position close to the first ink chamber 151 is approximately equal to the height of the first ink chamber 151 in the vertical direction Z, and is larger than the height of the second ink chamber 152 in the vertical direction Z at a position away from the first ink chamber 151. The volume of the first ink chamber 151 is smaller than the volume of the second ink chamber 152.

Note that the first ink chamber 151 and the second ink chamber 152 communicate with each other through a wall opening 156. Therefore, the pressure inside the first ink chamber 151 is almost equal to the pressure inside the second ink chamber 152, and the liquid surface of the ink contained in the first ink chamber 151 and the liquid surface of the ink contained in the second ink chamber 152 move upward in the vertical direction Z so as to have an approximately identical height.

As illustrated in FIG. 5, nine intersection ribs 157a to 157i (i.e., at least one intersection rib) that intersect the ceiling surface 137b and extend along the vertical direction Z are formed in the second ink chamber 152 at an interval in the depth direction Y. Diagonal ribs 158a to 158d (i.e., at least one eaves-like part) that intersect the vertical direction Z and the depth direction Y (horizontal direction) are also formed in the second ink chamber 152. Note that the intersection ribs 157a to 157i and the diagonal ribs 158a to 158d are integrally formed with the holder case 130 so as to perpendicularly intersect the sidewall 130b of the holder case 130, and protrude from the sidewall 130b toward the case opening 132 (i.e., the front side in FIG. 5).

As illustrated in FIGS. 4 and 5, the first diagonal rib 158a (i.e., the highest diagonal rib) is formed to slope downward from the intersection of the partition wall 150 and the ceiling surface 137b toward the rear side. The second diagonal rib 158a (i.e., the second highest diagonal rib) is formed to slope downward (gradually as compared with the first diagonal rib 158a) from a position of the partition wall 150 lower than the first diagonal rib 158a toward the rear side. Specifically, the first diagonal rib 158a and the second diagonal rib 158b are formed to intersect the partition wall 150 and intersect the depth direction Y. Note that the width of the first diagonal rib 158a and the second diagonal rib 158b in the transverse direction X is smaller than the width of the partition wall 150 and the intersection ribs 157a to 157i. Therefore, when the film 133 is bonded to cover the case opening 132, a gap is formed between the first diagonal rib 158a and the film 133 and between the second diagonal rib 158b and the film 133. Specifically, the spaces divided by the first diagonal rib 158a and the second diagonal rib 158b communicate each other through the gap.

The third diagonal rib 158c (i.e., first eaves-like part) and the fourth diagonal rib 158d (i.e., second eaves-like part) are formed on the side of the bottom 152a with respect to the second diagonal rib 158b at a position above the float valve 131. The third diagonal rib 158c is formed between the partition wall 150 and the first intersection rib 157a, and the fourth diagonal rib 158d is formed on the rear side with respect to the second intersection rib 157b. The third diagonal rib 158c and the fourth diagonal rib 158d are formed so as to be line-symmetrical with respect to an axis (not illustrated in the drawings) along the gravitational direction that passes through the center of the float valve 131, and slope downward from the center of the float valve 131 toward the end. Specifically, the distance between the upper end of the third diagonal rib 158c and the upper end of the fourth diagonal rib 158d is shorter than the distance of the lower end of the third diagonal rib 158c and the lower end of the fourth diagonal rib 158d.

Note that the width of the third diagonal rib 158c and the fourth diagonal rib 158d in the transverse direction X is approximately equal to the width of the partition wall 150. Each end of the third diagonal rib 158c and the fourth diagonal rib 158d is formed to be recessed toward the sidewall 130b. Therefore, when the film 133 is bonded to the bonding surface (right end face) of the third diagonal rib 158c and the fourth diagonal rib 158d, the recess function as a rib communication opening 161 that allows the ink to pass through. Specifically, the spaces divided by the third diagonal rib 158c and the fourth diagonal rib 158d communicate each other through the rib communication opening 161.

A rib opening 160 is formed in the intersection ribs 157a to 157i. Therefore, an almost identical pressure develops in the spaces situated on either side of each of the intersection ribs 157a to 157i. Therefore, the liquid surface of the ink contained in the second ink chamber 152 moves upward so as to have an approximately identical height in the vertical direction Z.

As illustrated in FIG. 5, the guide flow channel 138 is formed along the bottom 152a of the second ink chamber 152 at a position under the second ink chamber 152. The guide flow channel 138 includes a bent channel 163 that is bent along the shape of the ink holder 33, and allows the ink composition to flow through while changing the flow direction of the ink composition. The guide flow channel 138 also includes a connection channel 164 that connects the second ink chamber 152 and the bent channel 163, and a slope channel 165 that connects the bent channel 163 and the guide outlet 69.

The bent channel 163 includes two vertical channels 163a and 163b (i.e., at least one vertical channel) that extend along the vertical direction Z, and four bent parts 173a to 173d (i.e., a plurality of bent parts) that are formed on the end of the vertical channels 163a and 163b, and a horizontal channel 163c that extends along the depth direction Y.

3.2. Second Embodiment

An ink container 200 according to the second embodiment is described below with reference to FIG. 6.

Figure 6:
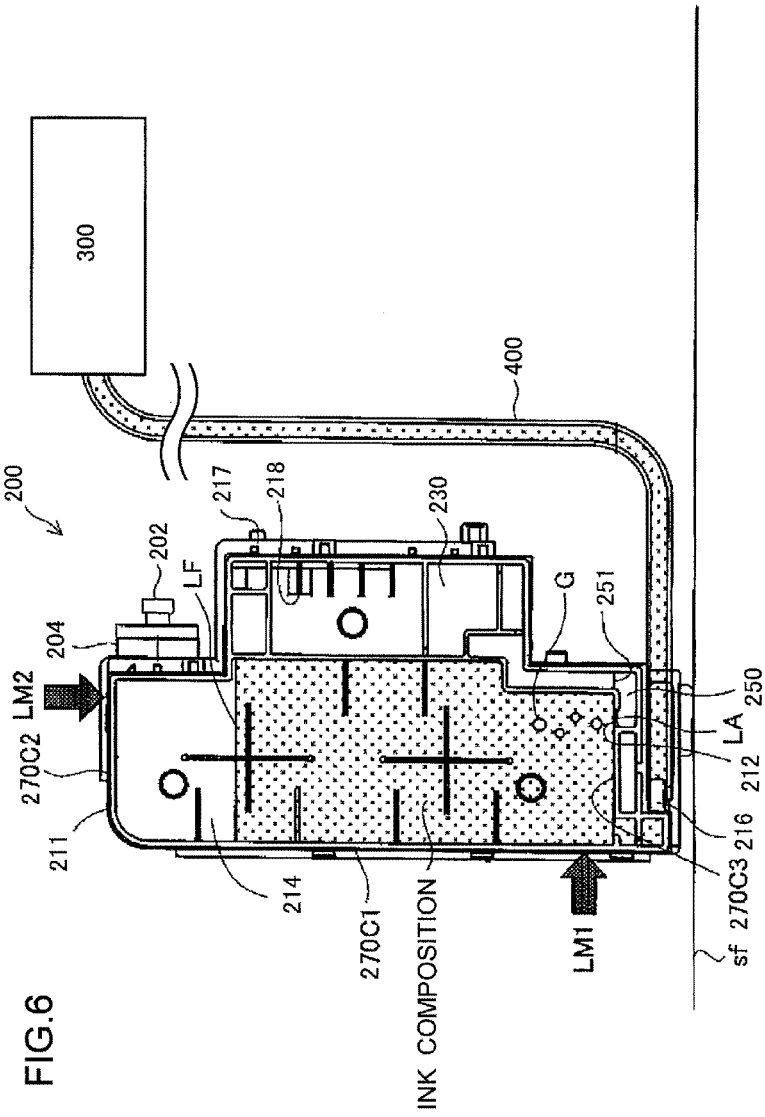
FIG. 6 is a schematic cross-sectional view illustrating an example of an ink container.

FIG. 6 is a schematic cross-sectional view illustrating the ink container 200 according to the second embodiment. The ink container 200 is connected to a recording head 300 through an ink supply channel 400.

The ink container 200 includes an ink chamber 214 that has an air inlet 212, and is configured so that air bubbles are formed in the ink composition by introducing air into the ink composition contained in the ink chamber 214 through the air inlet 212. The ink container 200 has a structure in which the ink composition can come in contact with the air. The ink container 200 may have a structure in which the ink composition comes in contact with the air inlet 212 in a state in which the ink is contained in the ink chamber 214 so that air bubbles are formed in the ink composition by introducing air through the air inlet 212.

The inkjet recording device may include a plurality of ink containers 200 (not illustrated in FIG. 6). The ink supply channel 400 may be formed of a material that exhibits flexibility (e.g., synthetic rubber), and may be a hose or a tube.

The ink composition supply method illustrated in FIG. 6 utilizes the principle of a Mariotte's bottle. Specifically, the recording head 300 and the ink container 200 are connected through the ink supply channel 400, and the ink composition is sucked from the ink container 200, and supplied to the recording head 300.

FIG. 6 illustrates a state in which the ink container 21 is fitted into the inkjet recording device in a usage state. The inkjet recording device is placed on a horizontal plane sf. Note that the term "usage state" used in connection with the inkjet recording device means that the inkjet recording device is in a state in which the inkjet recording device can eject the ink composition toward the medium so that the ink composition normally adheres to the medium, and the inkjet recording device need not necessarily be placed on a horizontal plane. An ink guide section 216 of the ink container 200 and the recording head 300 are connected through the ink supply channel 400.

The outer side of the ink container 200 includes a first wall 270C1, a second wall (upper wall) 270C2, and a bottom wall 270C3. The ink container 200 includes an air introduction channel and an ink channel. The air introduction channel is a channel for introducing air into the ink chamber 214 through an air opening 217, an air channel (not illustrated in FIG. 6), and an air inlet 218. An ink channel ink inlet 204 is an opening for filling the ink chamber 214 with the ink composition through the ink channel ink inlet 204.

The air introduction channel is a channel used for the above air induction operation. The air introduction channel includes the air opening 217 that opens to the outside (air), an air chamber 230 that is provided with the air inlet 218 at one end, and provided with an air chamber-side opening 251 at the other end, and an ink chamber communication channel 250 that is provided with the air chamber-side opening 251 at one end, and provided with the air inlet 212 at the other end. The air opening 217 communicates with the air, the air chamber 230 opens at the air inlet 218 (i.e., one end), and the air opening 217 and the air inlet 218 communicate with each other through a channel that is not illustrated in FIG. 6. Specifically, the air chamber 230 communicates with the outside (air). The air chamber-side opening 251 (i.e., one end) of the ink chamber communication channel 250 opens into the air chamber 230, and the air inlet 212 (i.e., the other end) of the ink chamber communication channel 250 opens into the ink chamber 214.

Specifically, the air chamber 230 communicates with the ink chamber 214. It is preferable that the ink chamber communication channel 250 have a small cross-sectional area to such an extent that a meniscus (liquid surface bridge) can be formed.

The air introduction channel is formed so that the air inlet 212 (i.e., one end) opens into the ink chamber 214, and the air opening 217 (i.e., the other end) opens to the outside. Specifically, a liquid surface that comes in direct contact with the air is formed in the ink chamber communication channel 250 (in the vicinity of the air inlet 212) when the ink container 200 is in a usage state, and air (air bubbles) is introduced into the ink contained in the ink chamber 214 from the air inlet 212 to introduce air (air bubbles G) into the ink chamber 214. This makes it possible to supply the ink composition from the ink container 200 to the recording head 300 in a stable manner.

The ink supply operation is performed along with a reduction in the amount of ink stored in the ink container 200 due to ejection of the ink from the recording head 300, and is performed in a stable manner due to the air introduction operation.

The state of the ink container 200 is classified into a usage state and an injection state. The term "usage state" used herein in connection with the ink container 200 refers to the state of the ink container 200 when the inkjet recording device is in a usage state. The ink inlet 204 opens in the horizontal direction when the ink container 200 is in the usage state. In this case, the opening of the ink inlet 204 is closed by a plug member 202. FIG. 6 illustrates the ink container 21 in the usage state. The ink chamber 214 and the air chamber 230 are situated side by side in the horizontal direction when the ink container 21 is in the usage state. The air inlet 212 is situated at a position lower than the liquid surface of the ink composition contained in the ink chamber 214 when the ink container 21 is in the usage state.

The term "injection state" used herein in connection with the ink container 200 refers to a state in which the ink container 200 is placed so that the ink inlet 204 opens upward. The ink chamber 214 and the air chamber 230 are situated side by side in the vertical direction when the ink container 21 is in the injection state. The air inlet 212 is situated at a position higher than the liquid surface of the ink composition contained in the ink chamber 214 (provided that the liquid surface of the ink composition contained in the ink chamber 214 is indicated by a straight line LM1 ("first state display line LM1" (see FIG. 6)) when the ink container 21 is in the usage state) when the ink container 21 is in the injection state.

When the ink container 21 is in the injection state, the user may stop filling the ink container 21 with the ink when the liquid surface of the ink composition has reached the vicinity of a straight line LM2 ("second state display line LM2" (see FIG. 6)) that horizontally extends when the ink container 21 is in the injection state. After the user has injected the ink composition into the ink chamber 214 from the ink inlet 204, the user seals the ink inlet 204 using the plug member 202. The ink contained in the ink chamber 214 is sucked from the recording head 300 so that negative pressure develops in the ink chamber 214.

The air inlet 212 is situated at a position lower than the first state display line LM1 when the ink container 21 is in the usage state. In FIG. 6, the air inlet 212 is formed in the bottom wall 270C3 of a container main body 211 (that defines the ink chamber 214) that is situated under the ink chamber 214 when the ink container 21 is in the usage state. This makes it possible to ensure that the liquid surface (air contact liquid surface) LA that comes in contact with the air is maintained at a constant height for a long time (e.g., a time required for the liquid surface of the ink composition to reach the first state display line LM1), even when the ink contained in the ink chamber 214 has been consumed, and the liquid surface of the ink composition contained in the ink chamber 214 has decreased. The air inlet 212 is situated at a position lower than the nozzle hole (not illustrated in FIG. 6) of the recording head 300 in the vertical direction when the ink container 21 is in the usage state.

When the ink composition has been sucked from the recording head 300, and a predetermined negative pressure has developed in the ink chamber 214, the ink composition contained in the ink chamber 214 is supplied to the recording head 300 through the ink supply channel 400.

When the ink contained in the ink chamber 214 has been consumed, the air contained in the air chamber 230 is introduced into the ink chamber 214 as the air bubbles G through the ink chamber communication channel 250. Therefore, the liquid surface LF within the ink chamber 214 moves downward. On the other hand, the height of the air contact liquid surface LA that comes in contact with the air is maintained constant.

3.3. Shape of Ink Container

The ink container according to the first embodiment and the ink container according to the second embodiment have a shape that satisfies the relationship "area of liquid surface at a filling ratio of 5%<area of liquid surface at a filling ratio of more than 5%" when the ink container is fitted into the inkjet recording device in the usage state, the filling ratio being the ratio of the volume of the ink composition (with which the ink container is filled) to the internal volume of the ink container, and the liquid surface being the gas-liquid interface of the ink composition that is formed inside the ink container.

When the ink container has such a shape, gas may be dissolved in the ink composition. However, since air bubbles can be promptly removed from the ink composition according to one embodiment of the invention, it is possible to ensure that the inkjet recording device exhibits sufficient ejection stability.

The ink container 21 according to the first embodiment may have such a size that the ink container 21 has a part in which the area of the gas-liquid interface of the ink composition that is formed inside the ink container 21 is 10,000 mm$^2$ or more when the ink container 21 is fitted into the inkjet recording device in the usage state. The ink container 21 according to the first embodiment and the ink container 200 according to the second embodiment may have such a size that the ink container has a part in which the area of the gas-liquid interface of the ink composition that is formed inside the ink container is 900 mm$^2$ or more when the ink container is fitted into the inkjet recording device in the usage state.

Since the ink container 21 according to the first embodiment that is formed in the shape of the letter "L" has a structure in which the second ink chamber 152 is connected to the connection channel 164 at a low position, it is possible to supply the ink composition in a stable manner even when most of the ink composition contained in the ink container 21 has been consumed. Therefore, it is possible to implement a continuous recording operation in a stable manner, for example.

The ink container 21 according to the first embodiment may have such a size that the area of the gas-liquid interface of the ink composition that is formed inside the ink container 21 in a state in which the ink container 21 is filled with the ink composition in a ratio of 95% with respect to the internal volume of the ink container 21 is equal to or larger than twice the area of the gas-liquid interface of the ink composition that is formed inside the ink container 21 in a state in which the ink container 21 is filled with the ink composition in a ratio of 5% with respect to the internal volume of the ink container 21 when the ink container 21 is fitted into the inkjet recording device in the usage state.

The ink container 200 according to the second embodiment may have such a size that the area of the gas-liquid interface of the ink composition that is formed inside the ink container 200 in the injection state is larger than the area of the gas-liquid interface of the ink composition that is formed inside the ink container 200 in the usage state in a state in which the ink container 200 is filled with the ink composition in a ratio of 50% with respect to the internal volume of the ink container 200. When the ink container has such a shape, it is possible to reduce the installation area when the ink container is fitted into the inkjet recording device. Moreover, since the ink container can be placed in a more stable manner when filling the ink container in the injection state with the ink composition, it is possible to fill the ink container with the ink composition in a more stable manner.

4 Inkjet Recording System

An inkjet recording system according to one embodiment of the invention includes an ink composition that includes a disperse dye, and at least one of a silicon-based surfactant and a fluorine-based surfactant, an ink container that is provided with an ink inlet through which the ink container can be refilled with the ink composition, and an inkjet recording device that includes a recording head having a nozzle hole that ejects the ink composition, the ink composition having a surface tension of 22 to 30 mN/m. The details of each element of the inkjet recording system are the same as described above.

According to the inkjet recording system, since air bubbles can be promptly removed from the ink composition when air bubbles have been formed in the ink composition, it is possible to suppress a situation in which air bubbles remain in the inkjet recording system, and ensure good ejection stability.

5. Inkjet Recording Method

An inkjet recording method according to one embodiment of the invention includes: filling an ink container with an ink composition, the ink composition comprising a disperse dye, and at least one of a silicon-based surfactant and a fluorine-based surfactant, and having a surface tension of 22 to 30 mN/m, and the ink container being provided with an ink inlet through which the ink container can be refilled with the ink composition; fitting the ink container into an inkjet recording device that includes a recording head having a nozzle hole that ejects the ink composition; and ejecting the ink composition from the nozzle hole so that the ink composition adheres to a medium.

The medium is not particularly limited. Examples of the medium include paper, a film, a cloth, an actual printing stock, a metal, glass, a polymer, and the like. The medium may be colorless and transparent, translucent, colored and transparent, chromatic and opaque, achromatic and opaque, or the like.

The inkjet recording method according to one embodiment of the invention may be applied to printing. For example, the inkjet recording method according to one embodiment of the invention may be applied to sublimation transfer printing since the disperse dye has sublimation properties. The inkjet recording method according to one embodiment of the invention may be applied to printing (direct sublimation printing) that utilizes a fabric cloth or the like as the medium. The inkjet recording method according to one embodiment of the invention may include a transfer step, a heating step, a steaming step, and the like corresponding to the printing method.

Since the inkjet recording method according to one embodiment of the invention fills the ink container with the ink composition, fits the ink container into the inkjet recording device, and ejects the ink composition so that the ink composition adheres to the medium, air bubbles can be promptly removed from the ink composition when air bubbles have been formed in the ink composition. Therefore, it is possible to ensure good ejection stability during inkjet recording, and implement a good recording process that can reliably form the entire image on the medium, for example.

6 Examples and Comparative Examples

The invention is further described below by way of examples and comparative examples. Note that the invention is not limited to the following examples.

6.1. Preparation of Ink Composition

The ink compositions of the examples and the comparative examples were prepared using the components shown in Table 1.

The details of the components shown in Table 1 are as follows. Kayaset Red B (manufactured by Nippon Kayaku Co., Ltd.) was used as Disperse Red 60 (disperse dye), and Oil Yellow 54 (manufactured by Chuo Synthetic Chemical Co., Ltd.) was used as Disperse Yellow 54 (disperse dye).

BYK-348 (manufactured by BYK Japan KK), Surflon S-211 (manufactured by Asahi Glass Co., Ltd.), and Surfynol 104PG50 (manufactured by Nissin Chemical Co., Ltd.) (acetylene glycol-based surfactant) were used as the surfactant either alone or in combination.

Lavelin (manufactured by Dai-ichi Kogyo Seiyaku Co., Ltd.) (formaldehyde condensate of sodium methylnaphthalenesulfonate) was used as the dispersant.

Triethylene glycol monomethyl ether, triethylene glycol monobutyl ether, and 1,2-hexanediol (reagent) were used as the penetrant either alone or in combination. Glycerol and triethanolamine (reagent) were used as the additional additive. Note that the HLB value of each penetrant shown in Table 1 was calculated using the expression "HLB value=10×(IV/OV)" (see "1.3.3. Penetrant").

After the addition of ion-exchanged water (balance) to a mixture of these components to adjust the content (mass %) of each component as shown in Table 1, the resulting mixture was stirred for 2 hours using a magnetic stirrer, and filtered through a membrane filter having a pore size of 5 micrometers to prepare each ink composition.

The surface tension of the resulting ink composition was measured using a surface tensiometer ("CBVP-Z" manufactured by Kyowa Interface Science Co., Ltd.). The results are shown in Table 1.

device ("PX-H6000") as a yellow cartridge. Note that the ink container used for evaluation had an ink inlet through which the ink container can be refilled with the ink composition, and had a shape that satisfies the relationship "area of liquid surface at a filling ratio of 5%<area of liquid surface at a filling ratio of more than 5%" when the ink container is fitted into the inkjet recording device in the usage state. The nozzle hole of the inkjet recording device ("PX-H6000") had a shape in which the area of the cross section of the nozzle hole perpendicular to the ink composition ejection direction decreased discontinuously in the ink composition ejection direction.

The ink composition was ejected toward premium glossy photo paper (PGPP) (manufactured by Seiko Epson Corporation) to continuously obtain thirty sheets of paper on which a solid pattern image was printed. The number of missing parts within the image was counted, and the ejection stability was evaluated in accordance with the following standard. The evaluation results are shown in Table 1.

A: The number of missing parts was 0.
B: The number of missing parts was 1 to 30.
C: The number of missing parts was 31 or more.

6.2.2. Storage Stability

The ink container that was filled with each ink composition as described above (see "6.2.1. Ejection stability") was

TABLE 1

| | | Example | | | | | | | | | Comparative Example | | | |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Disperse dye | Disperse Red 60 | 5 | — | 5 | — | 5 | 5 | — | 5 | 5 | 5 | 5 | 5 | 5 |
| | Disperse Yellow 54 | — | 3 | — | 3 | — | — | 3 | — | — | — | — | — | — |
| Dispersant | Lavelin AN-40 | 7.5 | 4.5 | 7.5 | 4.5 | 7.5 | 7.5 | 7.5 | 7.5 | 7.5 | 7.5 | 7.5 | 7.5 | 7.5 |
| Surfactant | BYK348 | 0.75 | 0.5 | 0.3 | 0.1 | 0.75 | 0.75 | — | 0.75 | 0.1 | 0.1 | — | — | — |
| | Surflon S211 | — | — | — | — | — | — | 0.1 | — | 0.1 | — | 1 | — | — |
| | Surfynol 104PG50 | — | — | — | — | — | — | — | — | — | — | — | 1 | 1 |
| Penetrant | Triethylene glycol monomethyl ether (HLB = 19.3) | 3 | 5 | 3 | 3 | 3 | 3 | 3 | 3 | 3 | — | — | — | — |
| | Triethylene glycol monobutyl ether (HLB = 13.5) | — | — | — | — | 1 | — | — | 2.5 | — | — | — | — | — |
| | 1,2-Hexanediol (HLB = 16.7) | — | — | — | — | — | 0.3 | 0.3 | — | — | — | — | — | 5 |
| Additional additive | Glycerol | 15 | 15 | 15 | 15 | 15 | 15 | 15 | 15 | 15 | 15 | 15 | 15 | 15 |
| | Triethanolamine | 0.5 | 0.5 | 0.5 | 0.5 | 0.5 | 0.5 | 0.5 | 0.5 | 0.5 | 0.5 | 0.5 | 0.5 | 0.5 |
| | Water | Balance | Balance | Balance | Balance | Balance | Balance | Balance | Balance | Balance | Balance | Balance | Balance | Balance |
| Surface tension (mN/m) | | 25 | 22 | 29 | 27 | 25 | 25 | 25 | 25 | 24 | 31 | 18 | 27 | 25 |
| Evaluation results | Ejection stability | A | A | B | B | A | A | A | A | A | C | C | B | B |
| | Ink storage stability | A | A | A | A | A | A | A | B | A | A | A | B | C |

6.2. Evaluation Methods 6.2.1. Ejection Stability

A dedicated cartridge (ink container) of an inkjet recording device "PX-H6000" (manufactured by Seiko Epson Corporation) was filled with each ink composition shown in Table 1. The ink container was fitted into the inkjet recording allowed to stand at 60° C. for 1 week. The ink composition was then removed from the ink container, and the viscosity of the ink composition, and the average particle size of the disperse dye were measured. The viscosity of the ink composition was measured at 20° C. using a viscoelasticity tester "MCR-300" (manufactured by Pysica) while increasing the shear rate from 10 to 1000. The viscosity when the shear rate was 200 was taken as the viscosity of the ink composition. The particle size D50 (i.e., the particle size at 50% in the cumulative volume average particle size distribution) of the disperse dye measured using a device "Microtrac UPA" (manufactured by Nikkiso Co., Ltd.) was taken as the average particle size of the disperse dye.

The viscosities and the average particle sizes measured before and after storage were compared, and the storage stability was evaluated in accordance with the following standard. The evaluation results are shown in Table 1.

A: A change in viscosity or a change in average particle size was less than 5%.
B: A change in viscosity or a change in average particle size was 5% or more and less than 10%.
C: A change in viscosity or a change in average particle size was less than 10% or more.

6.3. Evaluation Results

Excellent ejection stability was achieved when using the ink compositions of Examples 1 to 9 having a surface tension of 22 to 30 mN/m. Particularly excellent ejection stability was achieved when using the ink compositions of Examples 1, 2, and 5 to 9 having a surface tension of 22 to 25 mN/m. On the other hand, ejection stability was insufficient when using the ink compositions of Comparative Examples 1 and 2 having a surface tension falling outside the range of 22 to 30 mN/m.

Since excellent ejection stability was achieved when using the ink compositions of Examples 1 to 9 even when the ink container had an ink inlet through which the ink container can be refilled with the ink composition, and had a shape that satisfies the relationship "area of liquid surface at a filling ratio of 5%<area of liquid surface at a filling ratio of more than 5%" when the ink container is fitted into the inkjet recording device in the usage state, and the nozzle hole had a part in which the area of the cross section of the nozzle hole perpendicular to the ink composition ejection direction decreases discontinuously in the ink composition ejection direction, it is considered based on the above results that the ink compositions of Examples 1 to 9 had a high capability to remove (discharge) air bubbles.

The ink compositions of Examples 1 to 9 including a penetrant having an HLB value of 17 to 30 exhibited sufficient storage stability. However, the ink composition of Example 8 having a penetrant content of more than 1 mass % showed a slight deterioration in storage stability. When using the ink compositions of Comparative Examples 3 and 4 including the acetylene glycol-based surfactant, ejection stability and storage stability were insufficient although the surface tension was within the range of 22 to 30 mN/m. When using the ink composition of Comparative Example 4 including the penetrant having an HLB value of less than 17 in a ratio of 5 mass %, ejection stability was not improved as compared with Comparative Example 3, and storage stability was insufficient although the surface tension was 25 mN/m.

The invention is not limited to the above embodiments, and various modifications and variations may be made of the above embodiments without departing from the scope of the invention. For example, the invention includes various other configurations that are substantially the same as the configurations described in connection with the above embodiments (e.g., a configuration having the same function, method, and results, or a configuration having the same objective and results). The invention also includes a configuration in which an unsubstantial part described in connection with the above embodiments is replaced by another part. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

REFERENCE SIGNS LIST

1: nozzle plate, 2: nozzle hole, 3: boundary part, 4: ejection direction, 5: accumulation part, 11: inkjet recording device, 12: wheel, 13: leg, 14: main body, 15: feeder, 16: housing, 17: inlet, 18: outlet, 19: medium-receiving unit, 20: operation panel, 21: ink container, 22: ink container unit, 23: frame member, 24: recording head, 25: carriage, 33: ink holder, 34: slider, 37: first holder section, 38: second holder section, 39: upper side, 40: lower side, 41, 42: flat section, 43: connection part, 69: guide outlet, 73: ink inlet, 74: openable cover, 75: chip, 76: chip holder, 80: protrusion, 82: projection, 93: protrusion, 95: recess, 96: finger placement part, 130: holder case, 130a: locking part, 130b: sidewall, 131: float valve, 132: case opening, 133: film, 134: cover, 134a: claw part, 136: air chamber, 137: ink chamber, 137b: ceiling surface, 138: guide flow channel, 150: partition wall, 151: first ink chamber, 152: second ink chamber, 152a: bottom, 153: opposing surface, 156: wall opening, 157a to 157i: intersection rib, 158a to 158d: first to fourth diagonal ribs, 160: rib opening, 161: rib communication opening, 163: bent channel, 163a, 163b: vertical channel, 163c: horizontal channel, 164: connection channel, 165: slope channel, 173a to 173d: bent part, 200: ink container, 202: plug member, 204: ink inlet, 211: container main body, 212: air inlet, 214: ink chamber, 216: ink guide section, 217: air opening, 218: air inlet, 230: air chamber, 250: ink chamber communication channel, 251: air chamber-side opening, 270c1: first wall, 270c2: second wall, 270c3: bottom wall, 300: recording head, 400: ink supply channel, R: roll, S: paper, sf: horizontal plane, G: air bubble

The invention claimed is:

1. An ink composition comprising a disperse dye, at least one of a silicon-based surfactant and a fluorine-based surfactant, and a penetrant having an HLB value of 17 to 30, the ink composition having a surface tension of 22 to 30 mN/m.

2. An ink jet recording device comprising:
a recording head having a nozzle hole that ejects the ink composition of claim 1, wherein the nozzle hole includes a part in which an area of a cross section of the nozzle hole perpendicular to an ink composition ejection direction decreases discontinuously in the ink composition ejection direction;
an ink container for holding the ink composition, the ink container being provided with an ink inlet through which the ink container can be refilled with the ink composition.

3. The ink jet recording device according to claim 2, wherein
the ink container satisfies a relationship in which an area of a liquid surface of the ink composition in the ink container at a filling ratio of 5% is less than an area of a liquid surface at a filling ratio of more than 5%" when the ink container is fitted into the inkjet recording device in a usage state, the filling ratio being a ratio of a volume of the ink composition with which the ink container is filled to an internal volume of the ink container, and the liquid surface being a gas-liquid interface of the ink composition that is formed inside the ink container.

4. The ink composition according to claim 1, wherein the ink composition has a surface tension of 22 to 25 mN/m.

5. The ink composition according to claim 1, comprising a penetrant having an HLB value of less than 17 in a ratio of 1 mass % or less based on a total amount of the ink composition.

6. An inkjet recording system comprising:
    an ink composition that comprises a disperse dye, at least one of a silicon-based surfactant and a fluorine-based surfactant, and a penetrant having an HLB value of 17 to 30, wherein the ink composition has a surface tension of 22 to 30 mN/m;
    an ink container that is provided with an ink inlet through which the ink container can be refilled with the ink composition; and
    an inkjet recording device that includes a recording head having a nozzle hole that ejects the ink composition.

7. An inkjet recording method comprising:
    filling an ink container with an ink composition, the ink composition comprising a disperse dye, at least one of a silicon-based surfactant and a fluorine-based surfactant, and a penetrant having an HLB value of 17 to 30, and having a surface tension of 22 to 30 mN/m, the ink container being provided with an ink inlet through which the ink container can be refilled with the ink composition;
    fitting the ink container into an inkjet recording device that includes a recording head having a nozzle hole that ejects the ink composition; and
    ejecting the ink composition from the nozzle hole so that the ink composition adheres to a medium.

* * * * *